Sept. 13, 1960 S. O. SAMPSON 2,952,416

AUTOMATIC TAPE RECORDER INCLUDING PUSHBUTTON CONTROL

Filed May 25, 1959 2 Sheets-Sheet 1

INVENTOR.
SIDNEY O. SAMPSON
BY Zoltan H. Polachek
ATTORNEY

Sept. 13, 1960 S. O. SAMPSON 2,952,416

AUTOMATIC TAPE RECORDER INCLUDING PUSHBUTTON CONTROL

Filed May 25, 1959 2 Sheets-Sheet 2

INVENTOR.
SIDNEY O. SAMPSON
BY
Zoltan H. Polachek
ATTORNEY

United States Patent Office 2,952,416

Patented Sept. 13, 1960

2,952,416

AUTOMATIC TAPE RECORDER INCLUDING PUSHBUTTON CONTROL

Sidney O. Sampson, 216 E. 31st St., New York, N.Y.

Filed May 25, 1959, Ser. No. 815,350

6 Claims. (Cl. 242—55.12)

This invention relates to the art of magnetic tape recorders and particularly concerns a recorder having means for automatically reversing and stopping and reversing the direction of travel of a tape in the recorder.

A principal object of the invention is the provision of a recording system employing a magnetic opaque tape having transparent ends for automatically controlling stopping and reversing direction of travel of the tape in the recorder.

A further object is the provision of a magnetic tape recorder including photoelectric means for controlling travel of tape in the recorder.

A still further object is the provision of a magnetic tape recorder having manual controls for starting travel of the tape in one direction, reversing the direction of travel, and for stopping the tape, said recorder being provided with photoelectric means for automatically controlling stopping and reversing of the direction of travel of the tape.

Another object is the provision of a tape recorder of the character described, in which the photoelectric means cooperates with transparent ends of the tape, in stopping and reversing the direction of travel automatically.

The invention will be explained with reference to a recorder employing a tape magazine or cartridge, although it will be understood that the invention is applicable to any tape recorder provided with the control means to be described and employing a tape having transparent portions for cooperation with the control means. The tape magazine and tape are respectively subjects of others of my patent applications copending with this one.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
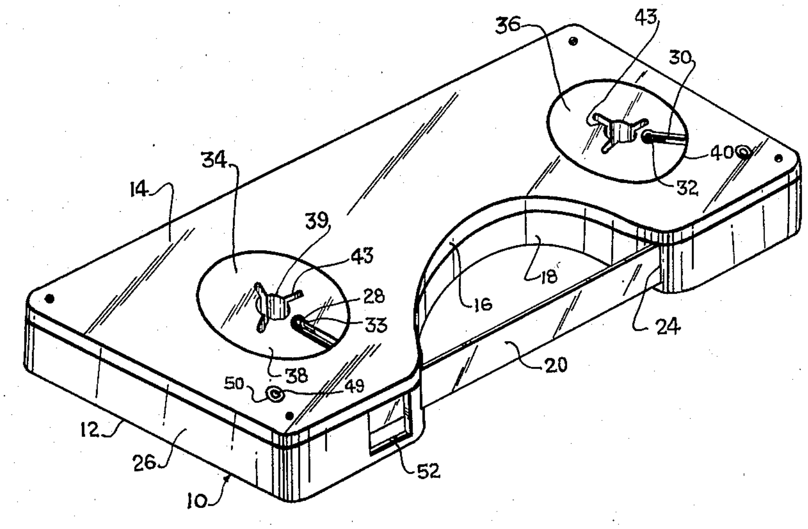
Fig. 1 is a perspective view of a tape magazine cartridge which may be employed with the recording system embodying the present invention.
Figure 2:
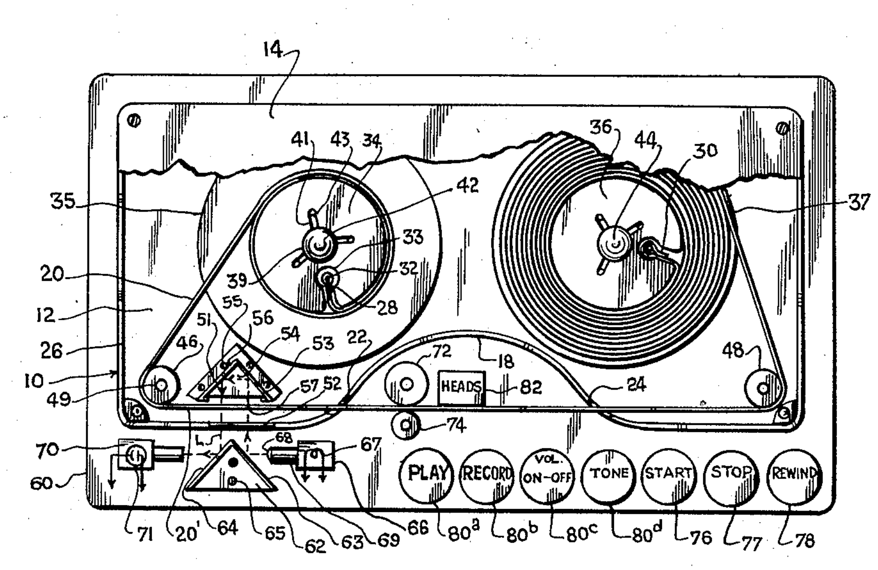
Fig. 2 is a plan view of the tape magazine or cartridge mounted on a recorder body.

In Figs. 1 and 2 is shown a tape magazine or cartridge 10 including a substantially rectangular base 12. On the base 12 is removably mounted a substantially rectangular cover 14. The base and cover may be made of plastic material. The cover may be attached to the cover by screws 11 or may be frictionally fitted or hinged to the base. Both base and cover have registering arcuate indentations 16 and 18. Magnetic tape 20 extends across a space partially defined by this indentation, and passes through slots 22, 24 in the vertical wall 26 of the base. Opposite ends of the tape are formed with loops 28, 30 respectively engaged on pins 32 centrally disposed in apertures 33 formed in hubs 34, 36 of reels 35, 37. Round holes 38, 40 are formed in the cover 14 in which the upper ends of the hubs are journaled for rotation. The reels are mounted on spindles 42, 44, having outwardly extending keys 41 engaged in slits 43 in the hubs.

Idler guide rollers 46, 48 are located near the corners of the base and guide the tape between the reels and slots 22, 24. The shafts 49 of the rollers are journaled in bearing elements 50 in the cover. An opening or window 52 is formed in the front wall of the base. Adjacent this opening is an optical prism 54 disposed in a bracket or socket 56 secured to the base by screws 55. This prism is preferably a 45°—45°—90° element having sides 51 and 53 inclined oppositely at 45° to the tape section 20' which passes in front of the prism parallel to its base 57, and inside opening 52.

In Fig. 2, the tape magazine 10 is shown removably mounted on a recorder 60 which includes a tape drive mechanism of which the spindles 42, and 44 are part. Disposed in front of the openings 52 is an optical element 62 which has two mirror surfaces 63, 64 disposed at right angles to each other. The mirror element 62 is secured to the recorder base 61 by screws 65. Adjacent to the reflective surface 63 is a housing 66 containing an incandescent lamp 67. The housing has a forward light projecting tube 69 in which is mounted a lens 68 for concentrating the lamp light into a fine, intense beam upon surface 63. Adjacent to reflective surface 64 is another housing 71 containing a photoelectric cell 70. It is preferred that the lamp emit a particular color light such as red, green, or blue. The photoelectric cell will be one which is not affected by ordinary, daylight or incandescent light but responds only to concentrated light beams of a particular color. Such photoelectric cells are made of cadmium sulphide, cadmium selenide, and the like.

The recorder has a capstan 72 located in the recessed or indented portion of the cartridge for driving the tape at constant speed. An idler roller 74 is disposed adjacent to the capstan for coaction therewith in driving the tape. The recorder is provided with start, stop, and rewind buttons 76—78 for controlling rotation of the reels and movement of the tape. Other buttons or control knobs 80A—80D operate the sound recording and sound reproducing apparatus (not shown) of the recorder. A magnetic recording and reproducing head assembly 82 is mounted on the recorder adjacent the tape in its path of travel from reel to reel. The head assembly is disposed in the indentation formed in the case of the cartridge.

Figure 3:
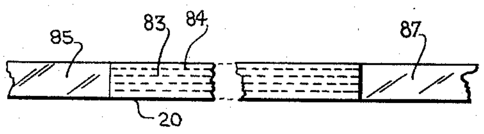
Fig. 3 is a fragmentary view of a magnetic tape with transparent ends employed in the recording system.

In operation of the recorder, the tape is driven from one reel to the other past the recording head assembly for playing or recording sound signals. The tape 20 has the construction indicated best in in Fig. 3. An opaque magnetic coating 84 on a transparent plastic film base 86 has one or more recording tracks 83 thereon. In the drawing four tracks are indicated, but more or less tracks may be used. The present invention is directed at the recording system employing photoelectric controlled means for reversing direction of travel of the tape and for stopping the tape, so the precise number of tracks on the tape, whether two, four, six or more, is immaterial as far as the invention is concerned. The invention involves the proper employment of the transparent leading and trailing ends 85 and 87 of the tape. These ends may be about forty inches or so in length. Their free ends are formed into the loops 28 and 30 shown in Figs. 1 and 2 engaged on the pins 32.

According to the invention it is desired that the tape be reversed in its direction of movement at the end of travel in one direction while recording or reproducing sound on one or more tracks. The reversely moving tape may then be driven at the same speed as previously if it is desired to record or reproduce sound on one or more other tracks, or the tape can be rewound at high speed after reversal. In any case it is desired that the tape be stopped automatically after travel in the reverse direction is completed. The transparent ends of the tape beyond the opaque magnetic section enable this automatic control to be achieved. This is accomplished with the aid of the photoelectric controlled system shown to best advantage in Fig. 4.

Figure 4:
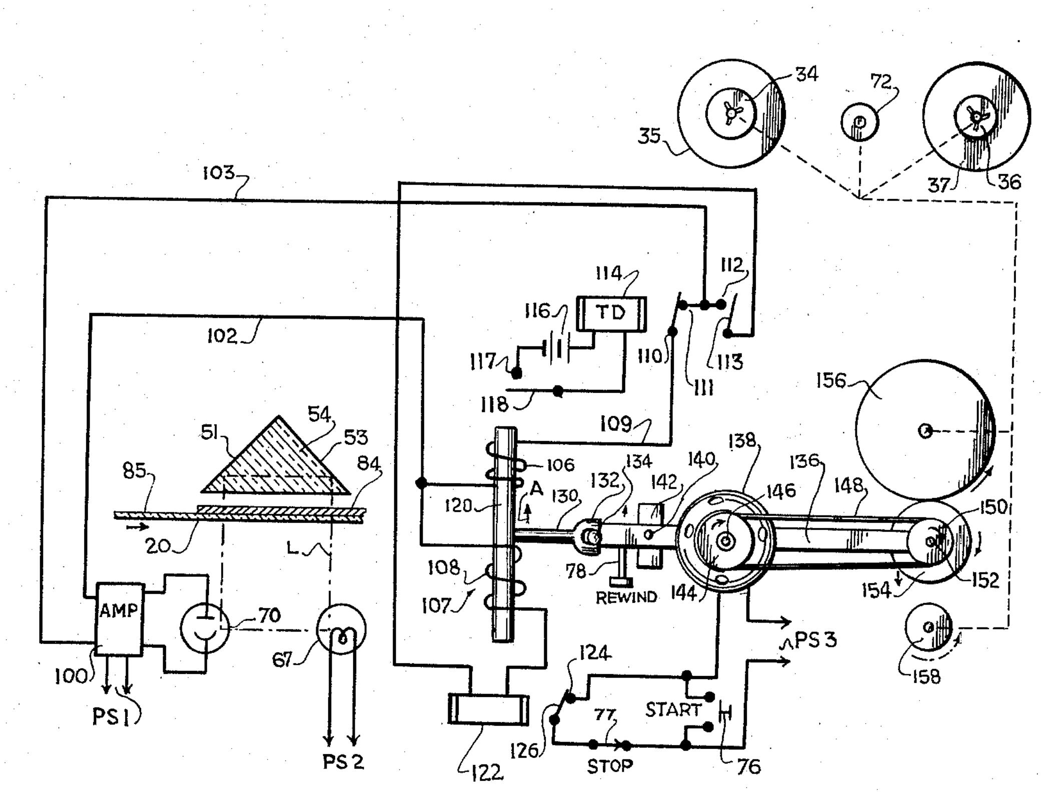
Fig. 4 is a diagram of the recording system embodying the invention.

Referring now to Fig. 4, there is shown photoelectric cell 70 which is excited by light from lamp 67 impinging thereon after travel twice through a transparent portion of tape 20 in a bent light path L. The light path includes the prism 54 from whose inclined sides 51, 53 the light is doubly refracted in passing from the lamp to the photocell. When the opaque portion 84 of the tape is interposed in front of the prism the light path L is blocked and the photoelectric cell is not excited. The lamp is energized by power source PS2.

Connected to the photoelectric cell is an amplifier 100 which amplifies pulses applied by the photoelectric cell. The amplifier is energized by a suitable power supply PS1. The amplifier is connected via wire 102 to opposing terminals of coils 106 and 108 of a solenoid 107. The amplifier is connected via wire 103 to contacts 111, 112 of a time delay relay 114. The relay has a pair of normally closed contacts 110, 111 and a pair of normally open contacts 112, 113. The relay coil is in series with a power source or battery 116 and a fixed switch contact 117. A movable contact 118 is normally open with respect to contact 117 and is disposed for closure therewith by plunger 120 which is associated with the solenoid coils 106 and 108. Coil 106 of the solenoid is connected via wire 109 to movable contact 110 of the time delay relay 114. Coil 108 is in series with the coil of relay 122. This relay is an instant acting type having normally closed contacts 124, 126. In series with the contacts is a manually operable single pole stop switch 77. A manually operable push button start switch 76 is connected across contacts 124, 126 for shorting them temporarily when necessary to start the tape drive.

Plunger 120 carries an arm 130 having a bifurcated or forked end 132 engaged with a pin 134 on a lever 136. This lever carries a motor 138 and is pivotable on a shaft 140 supported by a bracket 142. A pulley 144 is carried on the shaft 146 of the motor and drives an endless belt 148 engaged with a pulley 150 rotatably supported on lever 136. Secured to the shaft 152 of pulley 150 is a friction wheel 154 which is engaged with and drives a larger drive wheel 156 when the lever is in one position and which drives a smaller wheel 158 when the lever is in another position.

Wheels 156 and 158 are operatively connected to drive the reels 35, 36 and capstan 72 in one direction when wheel 156 is engaged by wheel 154 and in an opposite direction when wheel 158 is engaged by wheel 154. When the plunger 120 is in the position shown in the drawing, wheel 156 is being driven by wheel 154 at a slower speed than the speed of wheel 154 because wheel 156 is larger in diameter. When the plunger 120 is retracted upon actuation of coil 106, then lever 136 is pivoted to engage wheel 154 with wheel 158 so that the reels and capstan are driven in a reverse direction at a higher speed than previously because wheel 158 is smaller than wheel 154. A manually operable rewind control button or handle 78 is attached to lever 136.

In describing operation of the system of Fig. 4, it will be assumed that the recorder is playing or recording in conventional fashion while the motor is driving the tape 20 from reel 35 to 36 in the tape magazine 10. All components are in the position shown in the drawing. The trailing end of the opaque layer 84 on tape 20 is at prism 54 and the transparent trailing end 85 of the tape is approaching the prism. Suppose now that the transparent section 85 becomes disposed between window 52 and the prism; this will clear the optical path L so that photoelectric cell 70 will be excited by the light of lamp 67 passing through the transparent tape section 85 and the prism 54. When the cell 70 becomes excited it actuates the amplifier 100 whose output is applied to coil 106. The solenoid 107 becomes energized and the plunger 120 is retracted in the direction indicated by arrow A. This pivots lever 136 and the wheel 154 leaves wheel 156 and contacts wheel 158 to drive the tape at increased speed to rewind the tape on the reel 35.

When plunger 120 is retracted by coil 106, it closes switch contact 118 with contact 117 so that the relay 114 becomes energized. The normal time of operation of the relay is about ten to twenty seconds. This is an operation time range of many conventional commercially available thermal delay relays. After the prescribed time delay, relay 114 closes contacts 112, 113 and opens contacts 110, 111. As a result circuit of coil 106 is opened and the circuit of coil 108 is closed. The travel of the tape continues in reverse direction rewinding up on reel 35 until the transparent leading end 87 of the tape reaches the prism 54. Now the coil 108 becomes energized by the amplifier via relay 122. The plunger is now retracted by coil 108 so that wheel 154 contacts wheel 156. This restores the original slower speed drive position for recording or playing the apparatus. However, when current passes through the coil of relay 122, contacts 124, 126 open which opens the power supply circuit of motor 138. Since the motor is normally supplied with power via the normally closed contacts 124, 126 and power supply terminals PS3, the opening of its power supply circuit stops the motor.

If it is desired to start the motor, it is necessary to advance the tapes that the leading end passes beyond the optical path L. This is accomplished by manually closing the start push button 76 for a few seconds. This will cause the tape to be driven until the opaque layer 84 reaches the prism, whereupon the coil 108 will become deenergized along with relay 122 and contacts 124, 126 will close. The push button 76 can then be released, since the motor circuit will now be completed through contacts 124, 126. If it is desired to rewind the tape at high speed at any point of its travel, the rewind control 78 can be operated to pivot lever 136 and engage wheels 158 and 154.

If manual rewind is effected, this will be equivalent to actuation of the plunger by coil 106. Relay 114 will become energized and will close contacts 112, 113 while opening contacts 110, 111. Then when the leading end 87 of the tape reaches the optical path L, the motor will be stopped by operation of relay 122.

If it is desired that the tape travel in both directions at the same rate of speed, then wheels 156 and 158 should be of the same size. Thus the recorder can be used for playing or recording on one or more tracks in both directions of travel of the tape.

The recording system described provides photoelectrically controlled means whereby the looped ends of the tape cannot be disengaged from their respective reels since overrun of the tape at both ends of travel is automatically prevented. The transparent ends of the tape cooperate with the photoelectric control means for stopping and reversing the tape. The invention permits the tape to carry as many recording or playing tracks as desired and to record or reproduce in either or both directions of travel of the tape.

Instead of employing a cartridge or magazine containing the two reels, the invention may be applied to any conventional tape recorder employing independent supply and takeup reels. The prism 54, photoelectric cell 70 and lamp 67 can be added to any conventional tape recorder and the tape drive system of the recorder can be modified by addition of the mechanism and circuit shown in Fig. 4.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A magnetic tape recording system adapted for cooperation with a tape having an opaque magnetic portion and transparent ends, said ends being engaged on rotatable reels, comprising drive means for said reels for transporting the tape from one reel to the other, a recorder body, photoelectric means disposed on said body, and control means actuatable by said photoelectric means to start, stop and reverse said drive means, said control means including a solenoid in circuit with said photoelectric means, said solenoid having a two-position plunger operatively connected to said drive means to drive the tape in one direction in one position of the plunger and to drive the tape in an opposite direction in the other position of the plunger, said solenoid having two coils, and a time delay relay controllable by said plunger and having contacts in circuit with said coils, whereby said coils are alternately connected to said photoelectric means in the respective positions of said plungers.

2. A magnetic tape recording system adapted for cooperation with a tape having an opaque magnetic portion and transparent ends, said ends being engaged on rotatable reels, comprising drive means for said reels for transporting the tape from one reel to the other, a recorder body, photoelectric means disposed on said body, and control means actuatable by said photoelectric means to start, stop and reverse said drive means, said control means including a solenoid in circuit with said photoelectric means, said solenoid having a two-position plunger operatively connected to said drive means to drive the tape in one direction in one position of the plunger and to drive the tape in an opposite direction in the other position of the plunger, said solenoid having two coils, and a time delay relay controllable by said plunger and having contacts in circuit with said coils, whereby said coils are alternately connected to said photoelectric means in the respective positions of said plunger, one of said coils being effective to retract the plunger to said one position and the other of the coils being effective to retract the plunger to the other of said positions, said drive means including a support for a motor operating at a certain speed, said plunger being operative to pivot said support and effect drive of the tape in different directions.

3. A magnetic tape recording system adapted for cooperation with a tape having an opaque magnetic portion and transparent ends, said ends being engaged on rotatable reels, comprising drive means for said reels for transporting the tape from one reel to the other, a recorder body, photoelectric means disposed on said body, and control means actuatable by said photoelectric means to start, stop and reverse said drive means, said control means including a solenoid in circuit with said photoelectric means, said solenoid having a two-position plunger operatively connected to said drive means to drive the tape in one direction in one position of the plunger and to drive the tape in an opposite direction in the other position of the plunger, said solenoid having two coils, and a time delay relay controllable by said plunger and having contacts in circuit with said coils, whereby said coils are alternately connected to said photoelectric means in the respective positions of said plunger, one of said coils being effective to retract the plunger to said one position and the other of the coils being effective to retract the plunger to the other of said positions, said drive means including a support for a motor operating at a certain speed, said plunger being operative to pivot said support and effect drive of the tape in different directions, said support carrying a drive pulley and a first drive wheel driven by said motor, and spaced drive wheels located near the first drive wheel for selective rotation by the first drive wheel in opposite directions.

4. A magnetic tape recording system adapted for cooperation with a tape having an opaque magnetic portion and transparent ends, said ends being engaged on rotatable reels, comprising drive means for said reels for transporting the tape from one reel to the other, a recorder body, photoelectric means disposed on said body, and control means actuatable by said photoelectric means to start, stop and reverse said drive means, said control means including a solenoid in circuit with said photoelectric means, said solenoid having a two-position plunger operatively connected to said drive means to drive the tape in one direction in one position of the plunger and to drive the tape in an opposite direction in the other position of the plunger, said solenoid having two coils, and a time delay relay controllable by said plunger and having contacts in circuit with said coils, whereby said coils are alternately connected to said photoelectric means in the respective positions of said plunger, one of said coils being effective to retract the plunger to said one position and the other of the coils being effective to retract the plunger to the other of said positions, said drive means including a support for a motor operating at a certain speed, said plunger being operative to pivot said support and effect drive of the tape in different directions, said support carrying a drive pulley and a first drive wheel driven by said motor, and spaced drive wheels located near the first drive wheel for selective rotation by the first drive wheel in opposite directions, said drive wheels being operatively connected to said reels and a capstan for driving the tape in directions selected by said control means.

5. A magnetic tape recording system adapted for cooperation with a tape having an opaque magnetic portion and transparent ends, said ends being engaged on rotatable reels, comprising drive means for said reels for transporting the tape from one reel to the other, a recorder body, photoelectric means disposed on said body, and control means actuatable by said photoelectric means to start, stop and reverse said drive means, said control means including a solenoid in circuit with said photoelectric means, said solenoid having a two-position plunger operatively connected to said drive means to drive the tape in one direction in one position of the plunger and to drive the tape in an opposite direction in the other position of the plunger, said solenoid having two coils, and a time delay relay controllable by said plunger and having contacts in circuit with said coils, whereby said coils are alternately connected to said photoelectric means in the respective positions of said plunger, one of said coils being effective to retract the plunger to said one position and the other of the coils being effective to retract the plunger to the other of said positions, said drive means including a support for a motor operating at a certain speed, said plunger being operative to pivot said support and effect drive of the tape in different directions, said support carrying a drive pulley and a first drive wheel driven by said motor, and spaced drive wheels located near the first drive wheel for selective rotation by the first drive wheel in opposite directions, said drive wheels being operatively connected to said reels and a capstan for driving the tape in directions selected by said control means, said support being a lever pivotally engaged with a laterally extending arm on said plunger.

6. A magnetic tape recording system adapted for cooperation with a tape having an opaque magnetic portion and transparent ends, said ends being engaged on rotatable reels, comprising drive means for said reels for transporting the tape from one reel to the other, a recorder body, photoelectric means disposed on said body, and control means actuatable by said photoelectric means to start, stop and reverse said drive means, said control means including a solenoid in circuit with said photoelectric means, said solenoid having a two-position plunger operatively connected to said drive means to drive the tape in one direction in one position of the plunger and to drive the tape in an opposite direction in the other position of the plunger, said solenoid having two coils, and a time delay relay controllable by said plunger and having contacts in circuit with said coils, whereby said coils are alternately connected to said photoelectric means in the respective positions of said plunger, one of said coils being effective to retract the plunger to said one position and the other of the coils being effective to retract the plunger to the other of said positions, said drive means including a support for a motor operating at a certain speed, said plunger being operative to pivot said support and effect drive of the tape in different directions, said support carrying a drive pulley and a first drive wheel driven by said motor, and spaced drive wheels located near the first drive wheel for selective rotation by the first drive wheel in opposite directions, said drive wheels being operatively connected to said reels and a capstan for driving the tape in directions selected by said control means, said support being a lever pivotally engaged with a laterally extending arm on said plunger, said control means further including manually operable switching means in circuit with said motor for manual control of starting, stopping and reversing of drive of the tape.

References Cited in the file of this patent

UNITED STATES PATENTS

| | | |
|---|---|---|
| 2,683,568 | Lindsay | July 13, 1954 |
| 2,732,504 | Steele | Jan. 24, 1956 |

FOREIGN PATENTS

| | | |
|---|---|---|
| 808,096 | Great Britain | Jan. 28, 1959 |